(12) United States Patent
Chen

(10) Patent No.: US 6,648,534 B2
(45) Date of Patent: Nov. 18, 2003

(54) MULTIFUNCTIONAL KEYBOARD

(75) Inventor: Ding-Yuu Chen, Taoyuan (TW)

(73) Assignee: Darfon Electronics Corp., Taoyuan (TW)

(*) Notice: Subject to any disclaimer, the term of this patent is extended or adjusted under 35 U.S.C. 154(b) by 0 days.

(21) Appl. No.: 10/044,982

(22) Filed: Jan. 15, 2002

(65) Prior Publication Data

US 2002/0061216 A1 May 23, 2002

(30) Foreign Application Priority Data

Jan. 17, 2000 (TW) .................................... 90200917 U

(51) Int. Cl.7 ................................................ B41J 29/12
(52) U.S. Cl. ...................................... 400/715; 400/472
(58) Field of Search ................................ 400/715, 716, 400/713, 714, 472; 341/24, 22; 361/681, 680

(56) References Cited

U.S. PATENT DOCUMENTS

| | | | | |
|---|---|---|---|---|
| 4,604,605 A | * | 8/1986 | Meyers et al. ................. 341/34 |
| 4,679,482 A | * | 7/1987 | Simanski ...................... 84/467 |
| 5,661,641 A | * | 8/1997 | Shindo ......................... 361/814 |
| 5,733,056 A | * | 3/1998 | Meagher ...................... 400/472 |
| 6,226,501 B1 | * | 5/2001 | Weadon et al. .......... 455/575.3 |
| 6,262,716 B1 | * | 7/2001 | Raasch ......................... 345/168 |
| 6,489,949 B1 | * | 12/2002 | Yin .............................. 345/168 |
| 2003/0044213 A1 | * | 3/2003 | Stanton et al. ............... 400/472 |

* cited by examiner

*Primary Examiner*—Andrew H. Hirshfeld
*Assistant Examiner*—Anthony H. Nguyen
(74) *Attorney, Agent, or Firm*—Troxell Law Office PLLC

(57) ABSTRACT

A multifunctional keyboard consists of a keyboard body which has two sides respectively which each has a slide channel and a wrist guarding pad which includes an upper lid, a first wing plate and a second wing plate. The two wing plates are respectively located on a lower side of two edges of the upper lid, and have respectively an inner side at the front end mounting a slide element to couple with the slide channel of the keyboard body. The inner side at the front end of the first wing plate connects the slide element through an universal joint.

15 Claims, 10 Drawing Sheets

MULTIFUNCTIONAL KEYBOARD

FIELD OF THE INVENTION

The present invention relates to a keyboard for data entry and particularly a multifunctional keyboard that equips the function of a guarding pad, clipping documents and preventing from dust.

BACKGROUND OF THE INVENTION

Accompanying the flourishing innovations and developments of information technology, computers have become indispensable tools for many people in their daily life and work. Besides being widely used for processing business data, the computers also have been adopted for people's daily household works, such as browsing the Web on the Internet, purchasing, chatting, word processing, and the like. Keyboard is one of the important communication interfaces between people and the computer. The keyboard usually has a plurality of button keys located on the surface to represent different notations. When in use, users generally have to rest the wrist on table and strike the button keys with fingers for entering input data into the computer. It often happens that users have to sit in front of the computers for a long period of time to do work on the computers. However, hand operations on the keyboard generally do not conform to ergonomics in the present design of computers. In recent years there are a growing number of cases and reports indicated that users' wrists are prone to suffer from injury when operating the keyboard for a long period of time. Hence more and more people are trying to use wrist guarding pads to prevent the wrists from injury.

FIG. 1 illustrates a conventional keyboard and wrist pad. The keyboard 10 is for computer use and has a plurality of button keys located on the surface to represent different notations, including character keys, numeral keys and function keys. As the top surfaces of the button keys on the keyboard 10 is above the table top 12 for a certain distance, users have to raise the wrists to operate the keyboard when directly using the table top 12 to support the wrists. The excessive lifting of the wrists tends to incur injury on the wrists. To prevent mentioned problem, conventional approach is to place a wrist guarding pad 14 behind a rear side 16 of the keyboard 10. The wrist guarding pad 14 is a board with a slant top surface tapered from the rear side 16 of the keyboard 10 towards the table top 12. When an user does operations on the keyboard 10, the wrist may be rested on the wrist guarding pad 14. As the wrist guarding pad 14 has an elevation slightly greater than the table top 12, user's wrist may be supported by the wrist guarding pad 14 without lifting excessively and may be prevented from injury.

Although conventional wrist guarding pads may prevent users' wrists from injury, the keyboard and the wrist guarding pad are separate elements. When not in use, the wrist guarding pad occupies a lot of space. When in use, the wrist guarding pad and the keyboard should be assembled first. The wrist guarding pad also is easy to lose when moving the keyboard. All of the above creates a lot of inconveniences. As a result, the wrist guarding pad is still not widely accepted on the market. There are still rooms for improvement.

SUMMARY OF THE INVENTION

The primary object of the invention is to provide a multifunctional keyboard that has a guarding pad to protect users' wrists and also to function as a document board for holding documents.

Another object of the invention is to provide a multifunctional keyboard that has a guarding pad for covering the keyboard when the keyboard is not in use to guard the keyboard from contaminating by dust.

A further object of the invention is to provide a multifunctional keyboard that allows the guarding pad nestling under the keyboard to prevent the keyboard from occupying too much space.

The multifunctional keyboard of the invention consists of a keyboard body and a guarding pad. The keyboard body has two sides each has a slide channel. The slide channel has a front end and a rear end. The guarding pad includes an upper lid, a first wing plate and a second wing plate. The two wing plates are located respectively on a lower side of two edges of the upper lid, and have respectively a slide element located on an inner side at a front end thereof to couple with the slide channel of the keyboard body. The first wing plate further has an universal joint interposed between the inner side of the front end and the slide element for connecting the two.

The slide element of the guarding pad may be moved reciprocally in the slide channel of the keyboard body. When the slide element is moved to the front end of the slide channel, the guarding pad is covered the keyboard body surface to protect the keyboard. When the slide element is moved to the rear end of the slide channel, the guarding pad may be engaged with the rear side of the keyboard body to support users' wrists during operating the keyboard. When users want to enter data on the keyboard from documents, the slide element of the second wing plate may be disengaged from the slide channel, and through turning the universal joint, the guarding pad may be lifted upright with the fist wing plate resting on table top such that the guarding pad can function as a document board for holding documents. When the guard pad is not in use, the slide element of the guarding pad may be moved to the rear end of the slide channel and turned 180 degrees to nestle under the keyboard body.

The guarding pad of this invention offers the function of supporting users' wrists, protecting the keyboard, movable for storing or serving as a document board for holding documents. Thus it has more added values and has much more appealing to consumers.

The foregoing, as well as additional objects, features and advantages of the invention will be more readily apparent from the following detailed description, which proceeds with reference to the accompanying drawings.

DESCRIPTION OF THE PREFERRED EMBODIMENTS

The invention aims at providing a multifunctional keyboard that has a guarding pad to cover the keyboard surface for protecting the keyboard, is engageable with the rear end of the keyboard for supporting users' wrists, may be nestled under the keyboard and may be lifted to an upright condition on a table top to serve as a document board for holding documents. Details of the construction and function will be discussed below.

Figure 1:
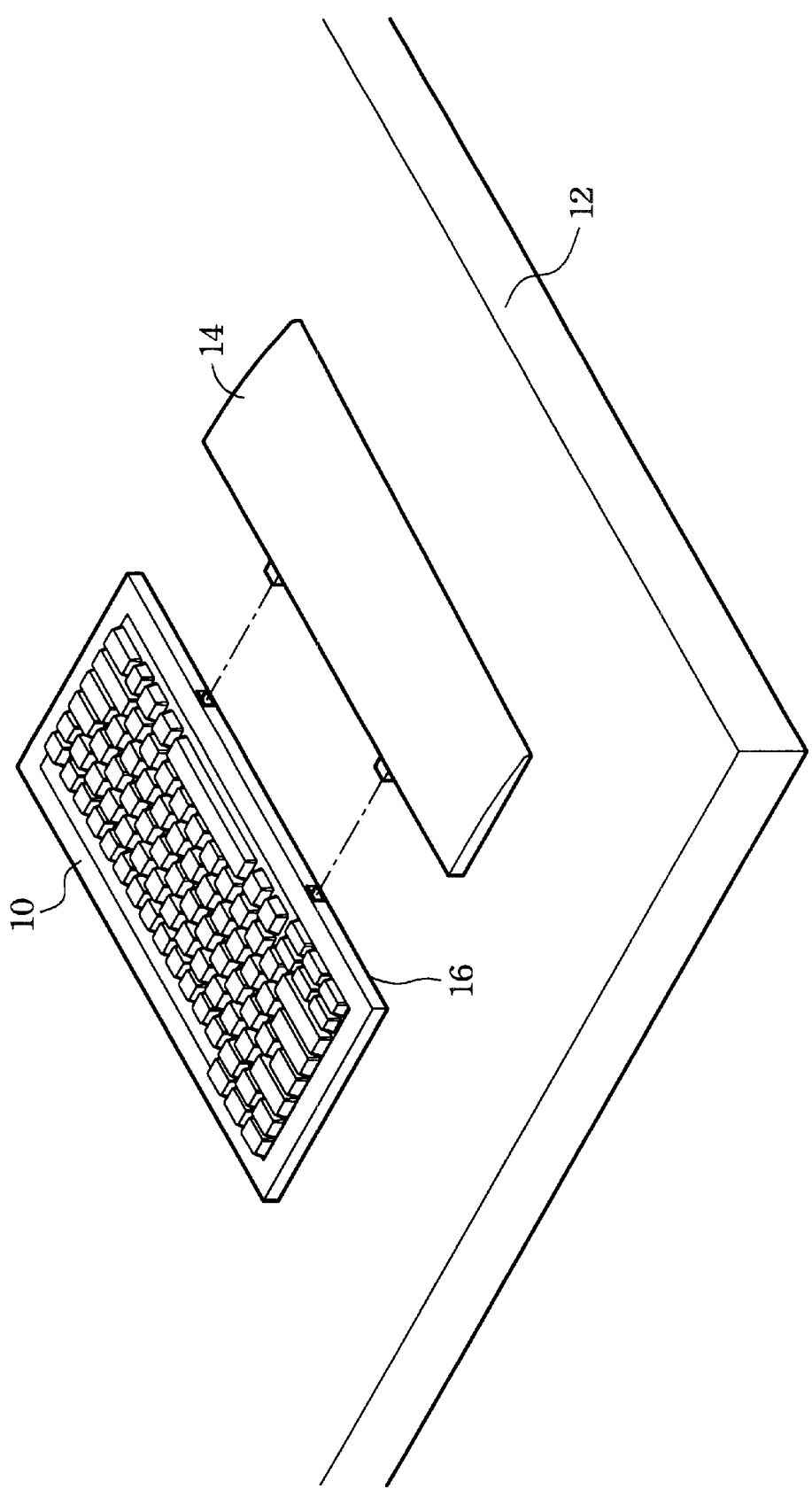
FIG. 1 is a schematic view of a conventional keyboard board and guarding pad.
Figure 2:
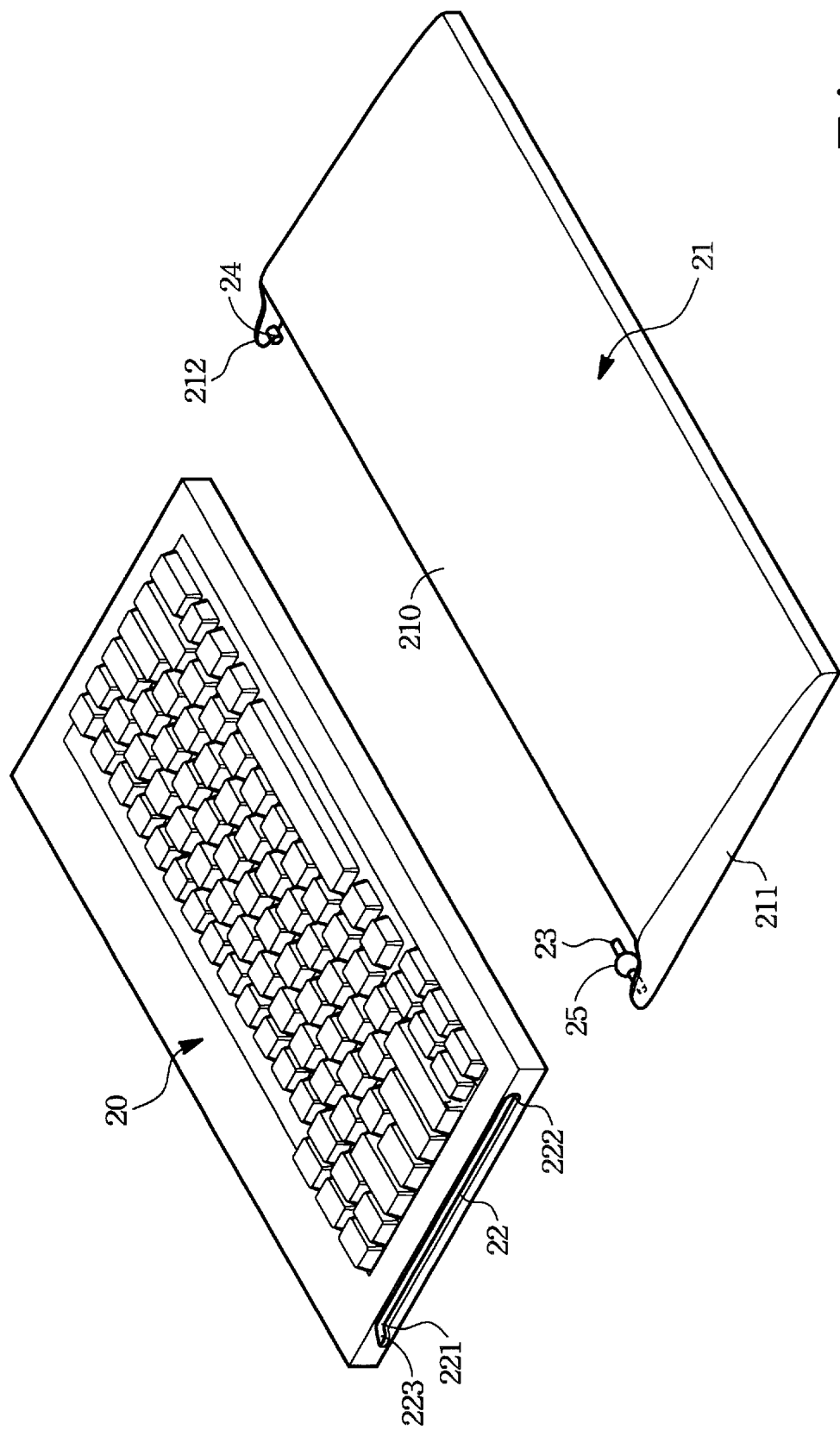
FIG. 2 is a perspective view of a first embodiment of the multifunctional keyboard of the invention.
Figures 3A, 3B:
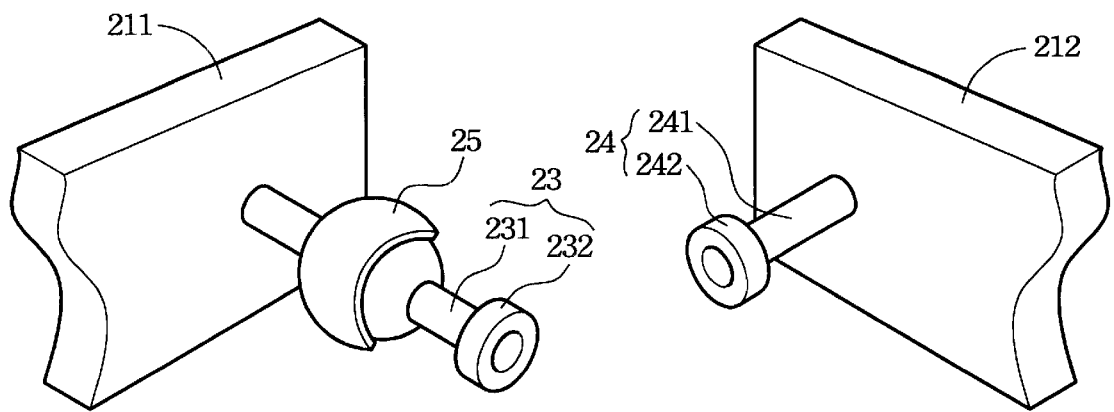
FIGS. 3A and 3B are perspective views of various embodiments of the slide element of the invention.

Referring to FIG. 2 for a first embodiment of the invention, the invention consists of a keyboard body 20 and a guarding pad 21. The keyboard body 20 that has two sides each has a slide channel 22 with a front end 221 and a rear end 222. The front end 221 of the slide channel 22 further is extended downwards to form an anchor groove 223. The guarding pad 21 is made of a plastic material by injection forming processes, and includes an upper lid 210, a first wing plate 211 and a second wing plate 212. The first and second wing plates 211 and 212 are attached respectively to a lower side of two edges of the upper lid 210. The wing plates 211, 212 further have respectively a slide element 23, 24 (preferably a round rod) located on an inner side of the front end thereof. The slide elements 23, 24 are slidable reciprocally in the slide channel 22 of the keyboard body 20. The first wing plate 211 further has an universal joint 25 interposed between the inner side of the front end and the slide element 23 for connecting the two. The slide elements 23, 24 may also consist of respectively a shaft 231, 241 and a roller 232, 242 for rolling in the slide channel (as shown in FIGS. 3A and 3B.)

Figure 4A:
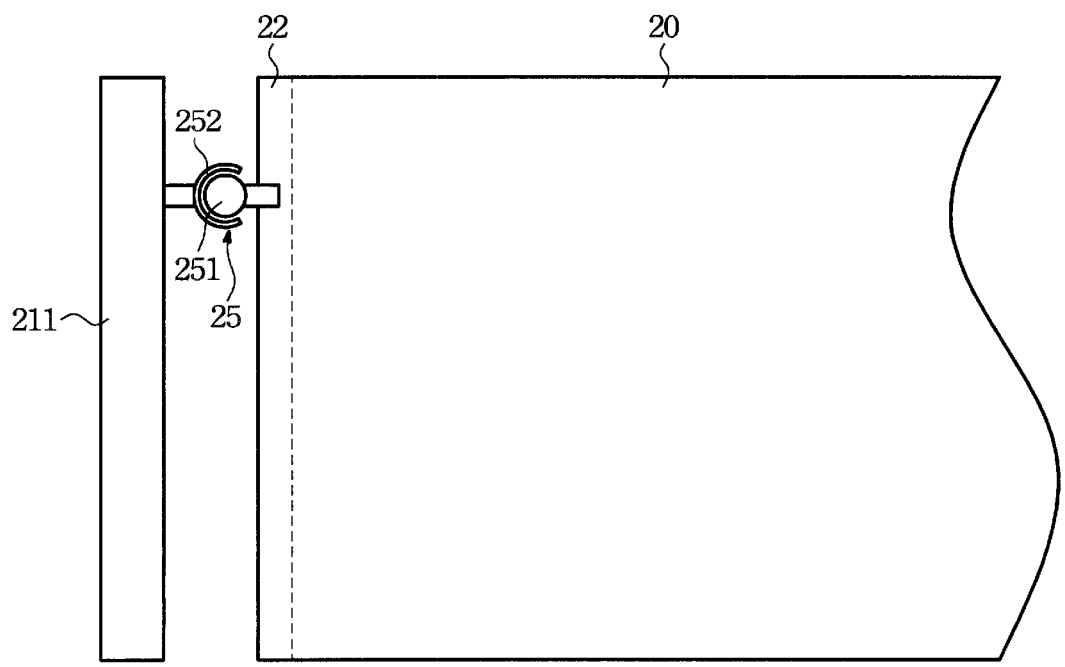
FIGS. 4A and 4B are schematic views of the first wing plate of the invention coupling with a slide element through an universal joint according to the invention.
Figure 4B:
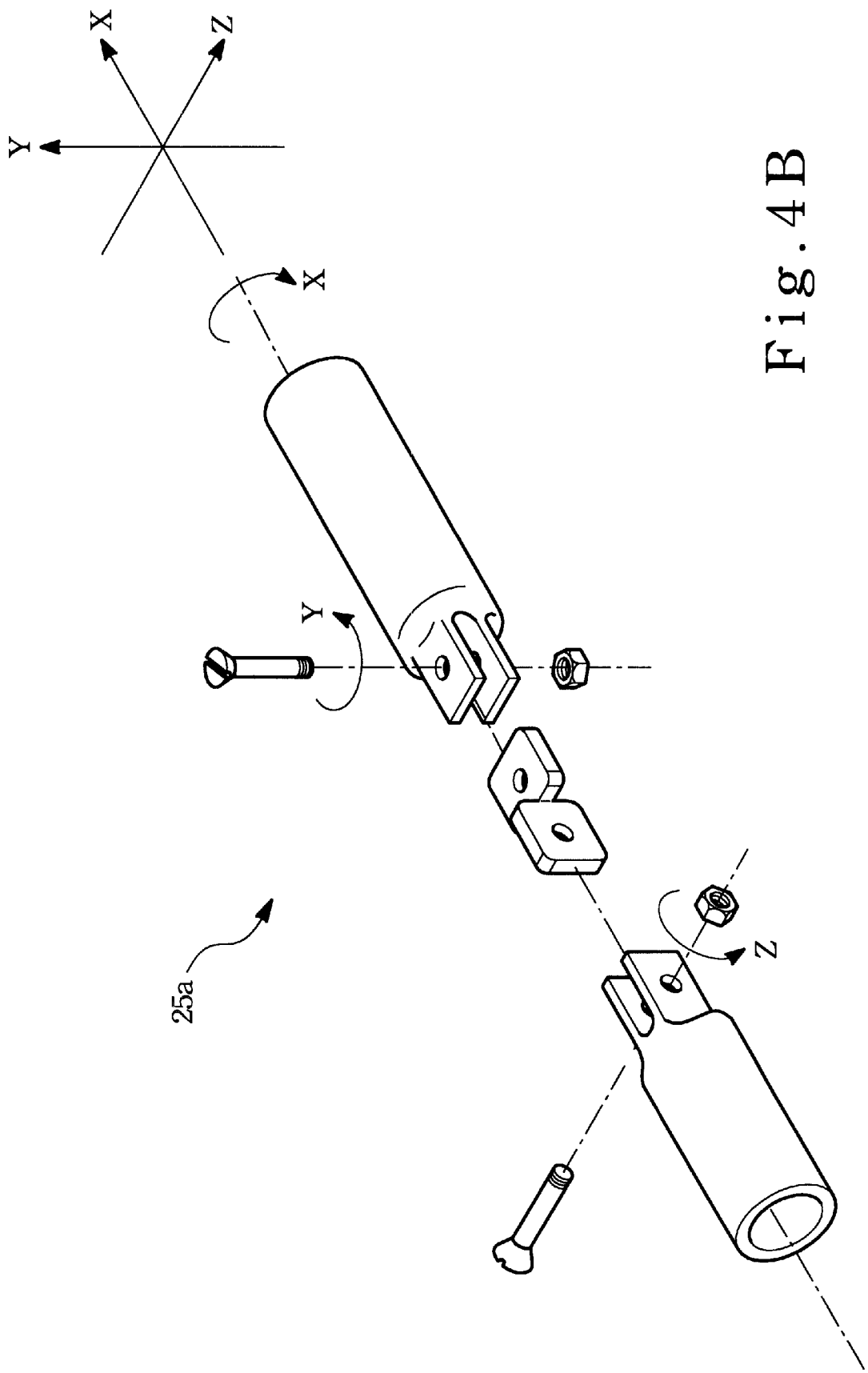

Referring to FIGS. 4A and 4B for the first wing plate to couple with the slide element through the universal joint, the universal joint shown in FIG. 4A is a ball type universal joint which includes a ball head 251 and a ball hub 252 for coupling the ball head 251. Its construction is known in the art, thus will be omitted here. The universal joint thus may provides a mechanism for turning in X, Y and Z directions. Hence the first wing plate 211 may be turned relative to the keyboard body 20 in various directions. FIG. 4B illustrates a standard universal joint 25*a*. It is to be noted that the universal joint 25*a* provides a mechanism for turning in X, Y and Z directions. Hence the first wing plate 211 may be turned relative to the keyboard body 20 in various directions as shown in the drawing by arrow marks.

Figure 5A:
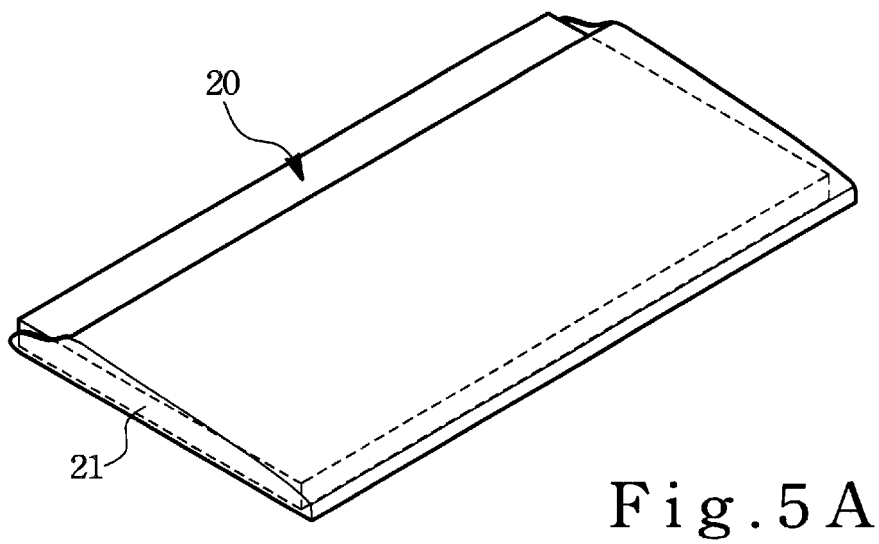
FIGS. 5A, 5B and 5C are pictorial views of the guarding pad in use.
Figure 5B:
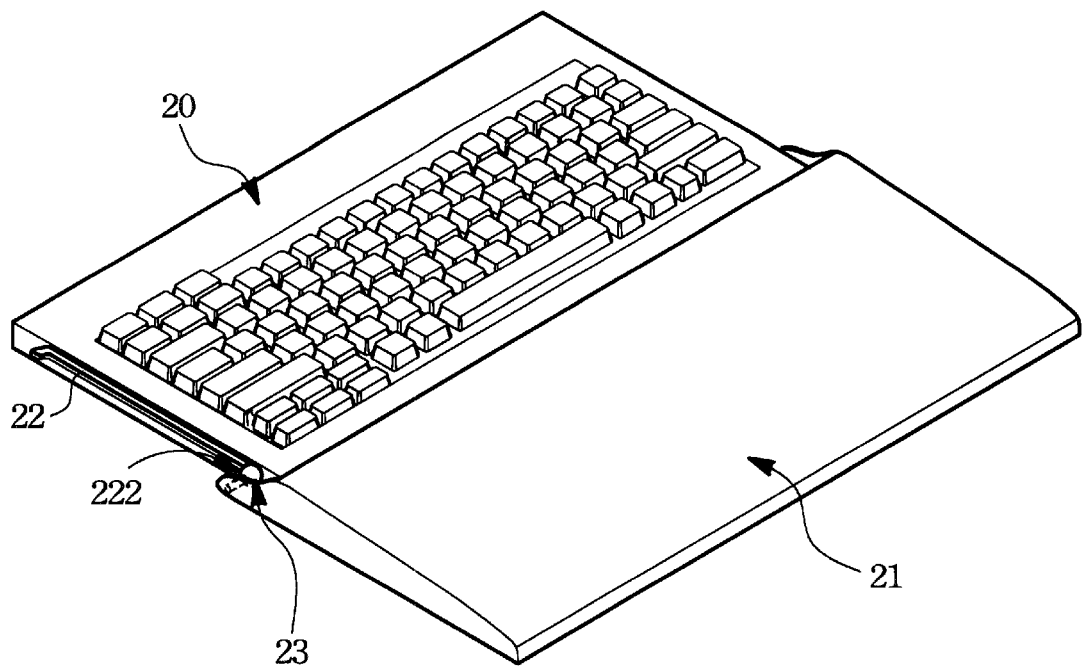
Figure 5C:
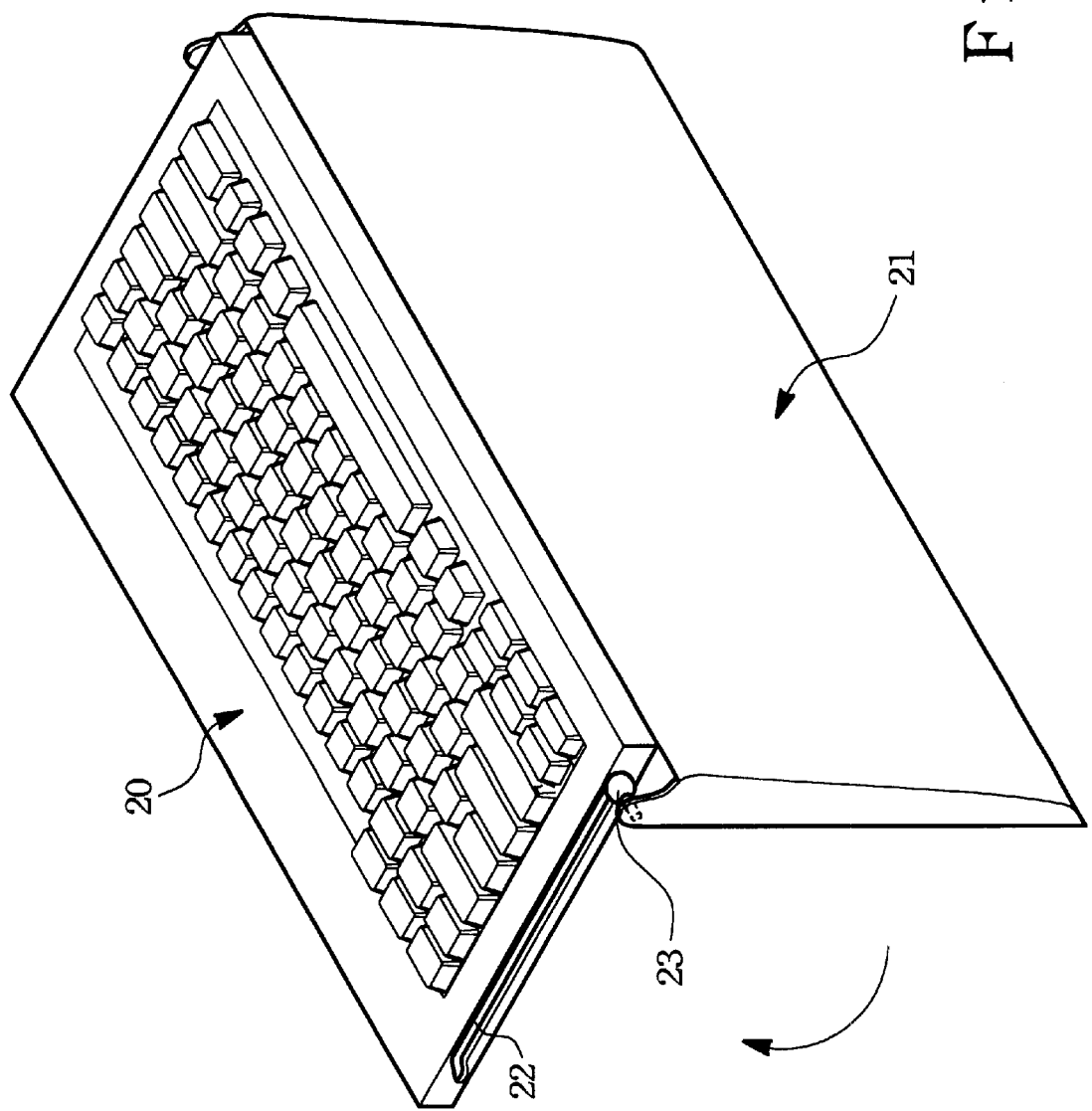

Referring to FIGS. 5A, 5B and 5C, when the keyboard is not in use, the slide elements 23, 24 of the guarding pad 21 may be moved to the front end 221 of the slide channel 22 to engage with the anchor groove 223 so that the slide elements 23, 24 will be anchored without slipping out. Under such a situation, the guarding pad 21 will cover the surface of the keyboard body 20 for protecting the keyboard (shown in FIG. 5A). When the keyboard is in use, the slide elements 23, 24 of the guarding pad 21 may be moved to the rear end 222 of the slide channel 22 to allow the guarding pad 21 engaging with the rear side of the keyboard body 20. Under such a situation, the guarding pad 21 will be extended from the keyboard body 20 for supporting users' wrists (as shown in FIG. 5B). In an event which users want to operate the keyboard without the guarding pad 21, the slide elements 23, 24 may be moved to the rear end 222 of the slide channel 22 and the guarding pad 21 may be turned 180 degrees and placed under the keyboard body 20 such that more space may be spared for use, and the guarding pad 21 may be prevented from losing (as shown in FIG. 5C).

Figure 6:
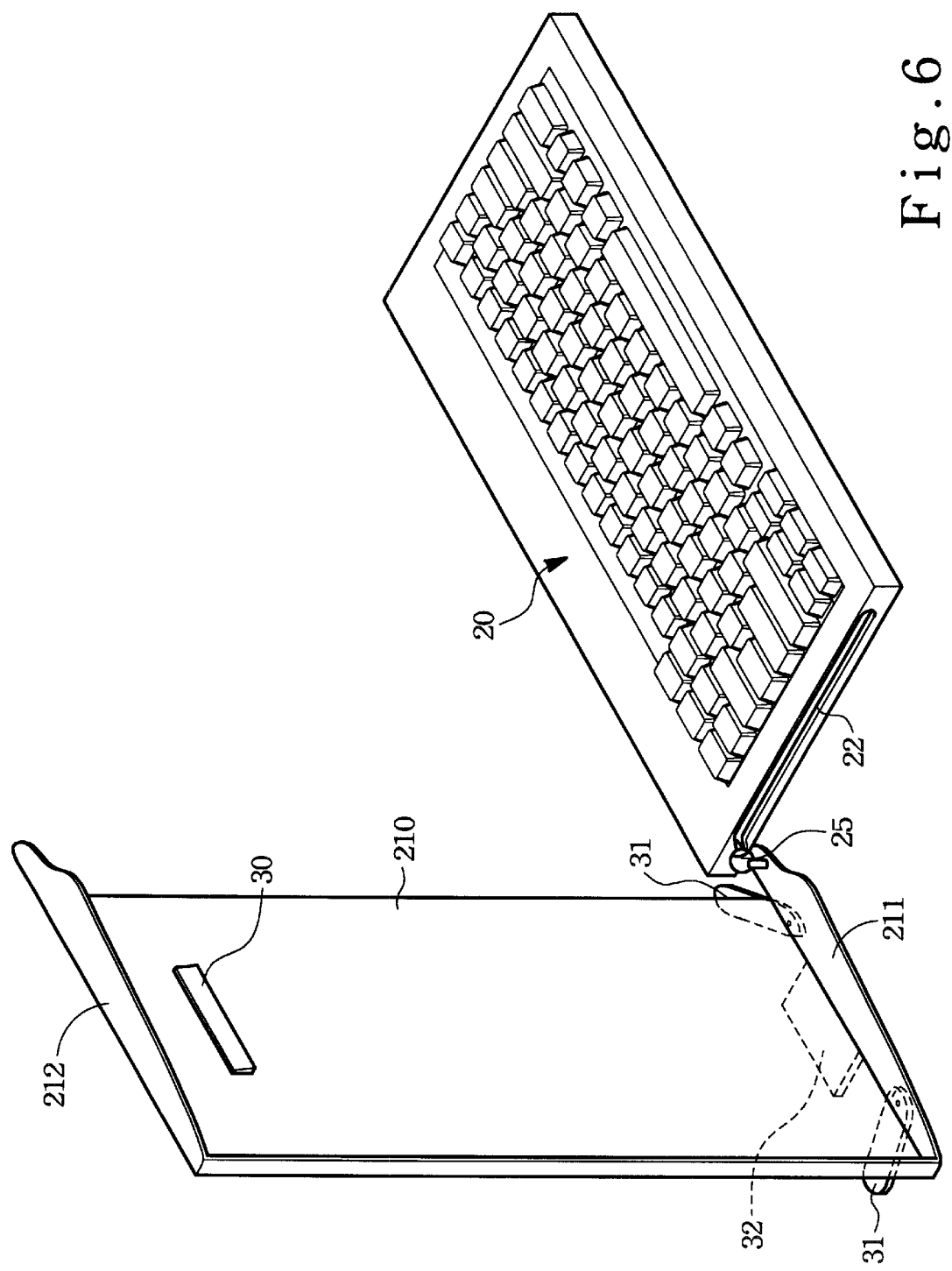
FIG. 6 is a perspective view of the guarding pad of the invention serving as a document board.

Referring to FIG. 6, when users want to enter data from documents to the keyboard body 20, the slide element 24 of the second wing plate 212 may be detached and moved away from the slide channel 22. As plastic material generally has elasticity, the slide element 24 may be separated easily from the slide channel 22 by exerting a slight outward force on the second wing plate 212. The separation may be done most easily when the slide element 24 is moved to the front end 224 of the slide channel 22.

When the slide element 24 of the second wing plate 212 is separated from the slide channel 22 of the keyboard body 20, the guarding pad 21 may be turned and lifted about the universal joint 25 relative to the keyboard body 20. The guarding pad 21 is still engaged with keyboard body 20 through the connections among the slide channel 22 and the universal joint 25 and the slide element 23. The first wing plate 211 may be rested on the table in a substantially upright manner, and may be a holder for holding documents. There is a paper clip 30 mounted on an inner side of the guarding pad 21 adjacent to the second wing plate 212 for clipping and holding documents. In order to allow the first wing plate 211 resting on the table more securely, the first wing plate 211 may be made with a greater thickness. To increase the standing steadiness of the guarding pad 21, at least one extensible support bracket 31 is disposed on the outer bottom side of the first wing plate 211 and may be deployed and extended on the table when the guarding pad 21 is lifted from the keyboard body 20. At least one other extensible support bracket 32 may also be deployed on an outer side of the upper lid 210 adjacent to the first wing plate 211 to extend and rest on the table to allow the guarding pad 21 standing steadily on the table. As the guarding pad of the invention can prevent users' wrists from injury, protect the keyboard from impact or dust contamination, and may be nestled under the keyboard to save table space, and also can function as a document board for holding documents, its functionality and added value can be greatly increased, thus creates more appealing to consumers.

Figure 7:
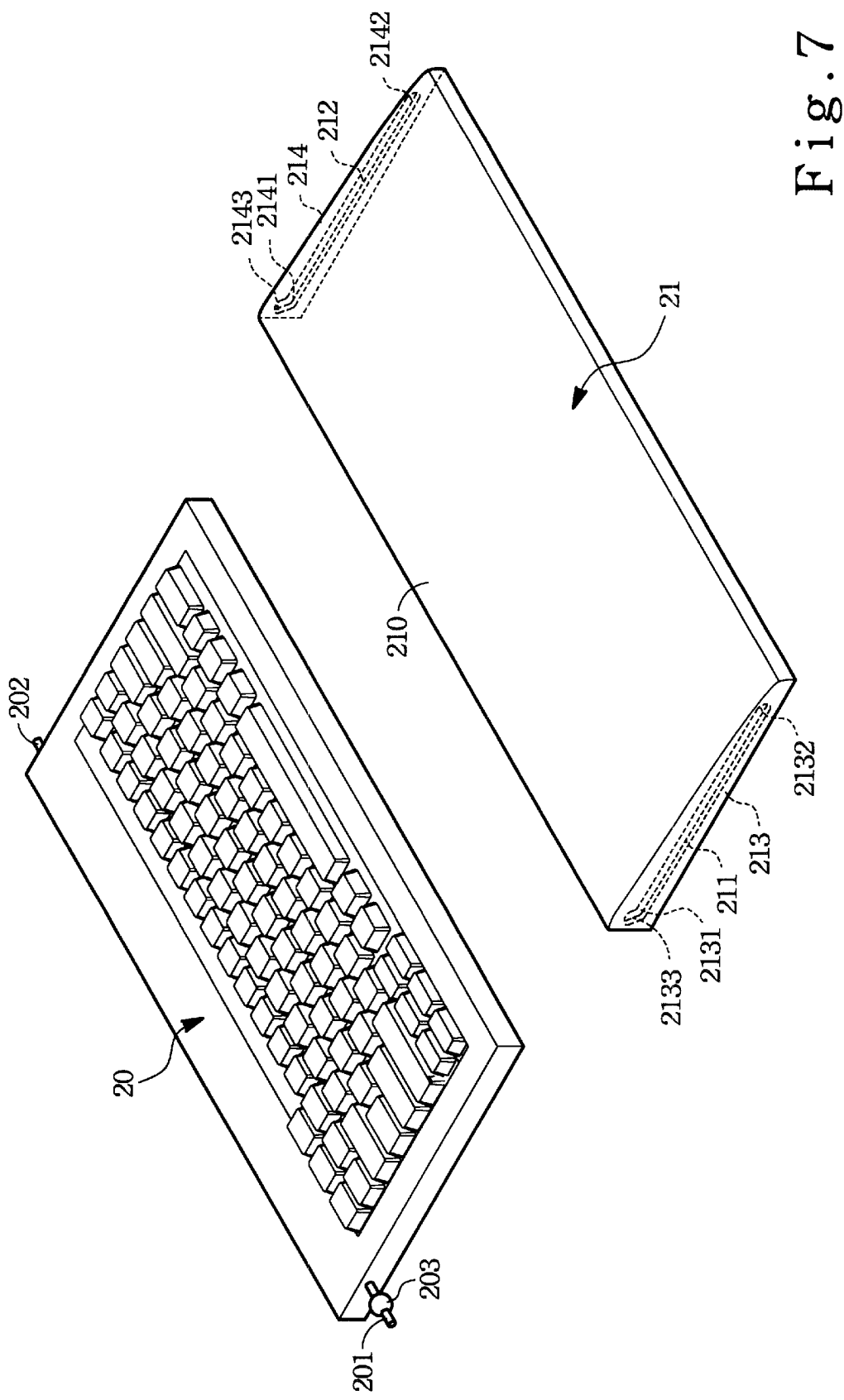
FIG. 7 is a perspective view of a second embodiment of the multifunctional keyboard of the invention.

Referring to FIG. 7 for a second embodiment of the invention. It is largely constructed like the first embodiment set forth above. However, in the second embodiment the first and second wing plate 211, 212 have respectively a first slide channel 213 and a second slide channel 214 formed on an inner side thereof. The slide channels 213, 214 have respectively a front end 2131, 2141 and a rear end 2132, 2142. The front ends 2131, 2141 of the slide channels 213, 214 have respectively an anchor groove 2133, 2143 extending upwards. There are a first and a second slide element 201, 202 located respectively on the front end of two sides of the keyboard body 20. The first slide element 201 is engaged with the keyboard body 20 through an universal joint 203. The first and the second slide element 201, 202 are coupled respectively within the first and second slide channel 213, 214.

Figure 8A:
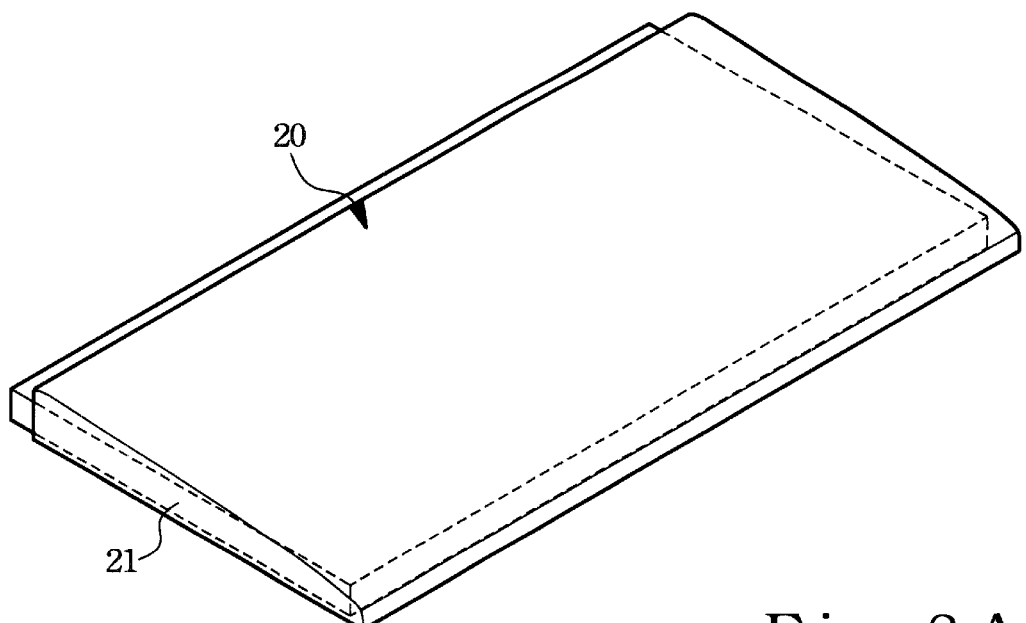
FIGS. 8A, 8B and 8C are pictorial views of the guarding pad of the second embodiment in use.

When the guarding pad 21 is moved where the slide elements 201, 202 positioning on the front ends 2131, 2141 of the slide channels 23, 214, the guarding pad 21 may cover the keyboard body 20 to prevent the keyboard from dust contamination. When the guarding pad 21 is moved and the slide elements 201, 202 are engaged with the anchor grooves 2133, 2143 at the front ends 2131, 2141, the guarding pad 21 may be anchored on the keyboard body 20 and cannot be moved freely (as shown in FIG. 8A).

When the guarding pad 21 is moved where the slide elements 201, 202 are located at the front ends 2131, 2141 of the slide channels 213, 214, the guarding pad 21 may be detached and lifted at the second wing 212, and through turning the universal joint 203, the first wing plate 211 may be rested on the table to allow the guarding pad become a document board. The first wing plate 211 may be made with a greater thickness to allow the first wing plate 211 resting on the table more securely. A paper clip 30 may be mounted to an inner side of the guarding pad 21 adjacent to the second wing plate 212 for clipping the documents. To increase the standing steadiness of the document board, at least one support bracket 31 may be deployed on the outer side of the first wing plate 211, and at least another support bracket 32 may be deployed on an outer side of the upper lid 210 adjacent to the first wing plate 211 (as shown in FIG. 8B).

Figure 8C:
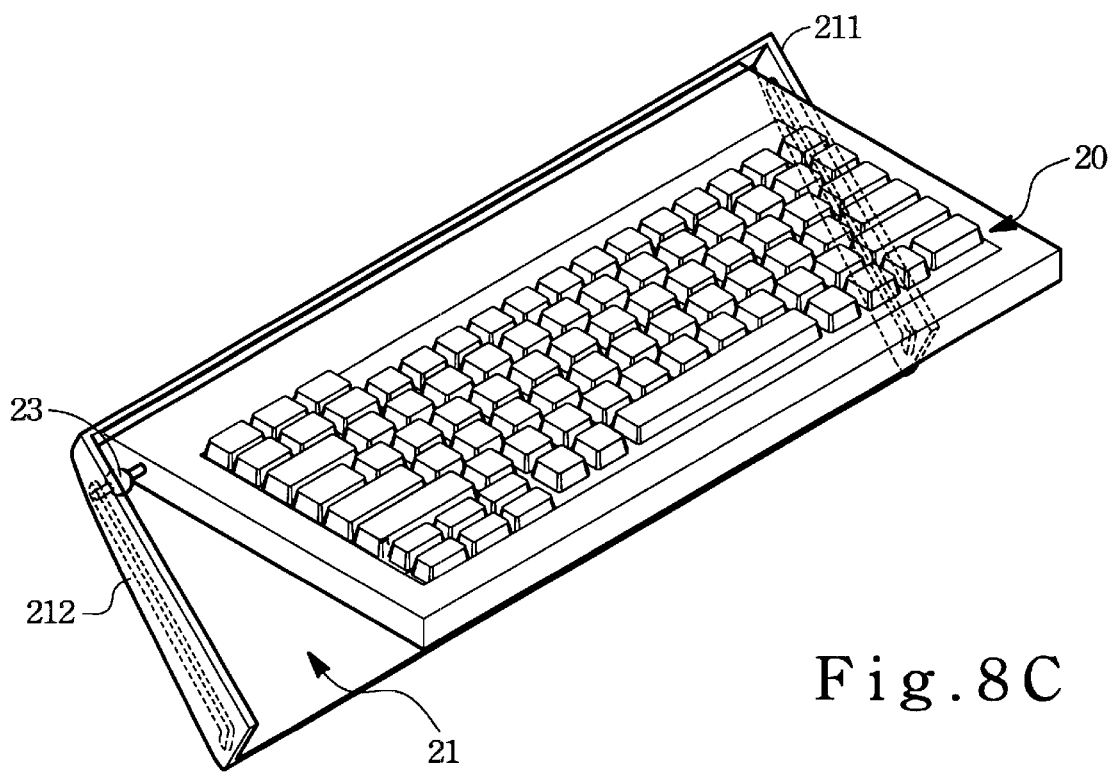
Figure 8B:
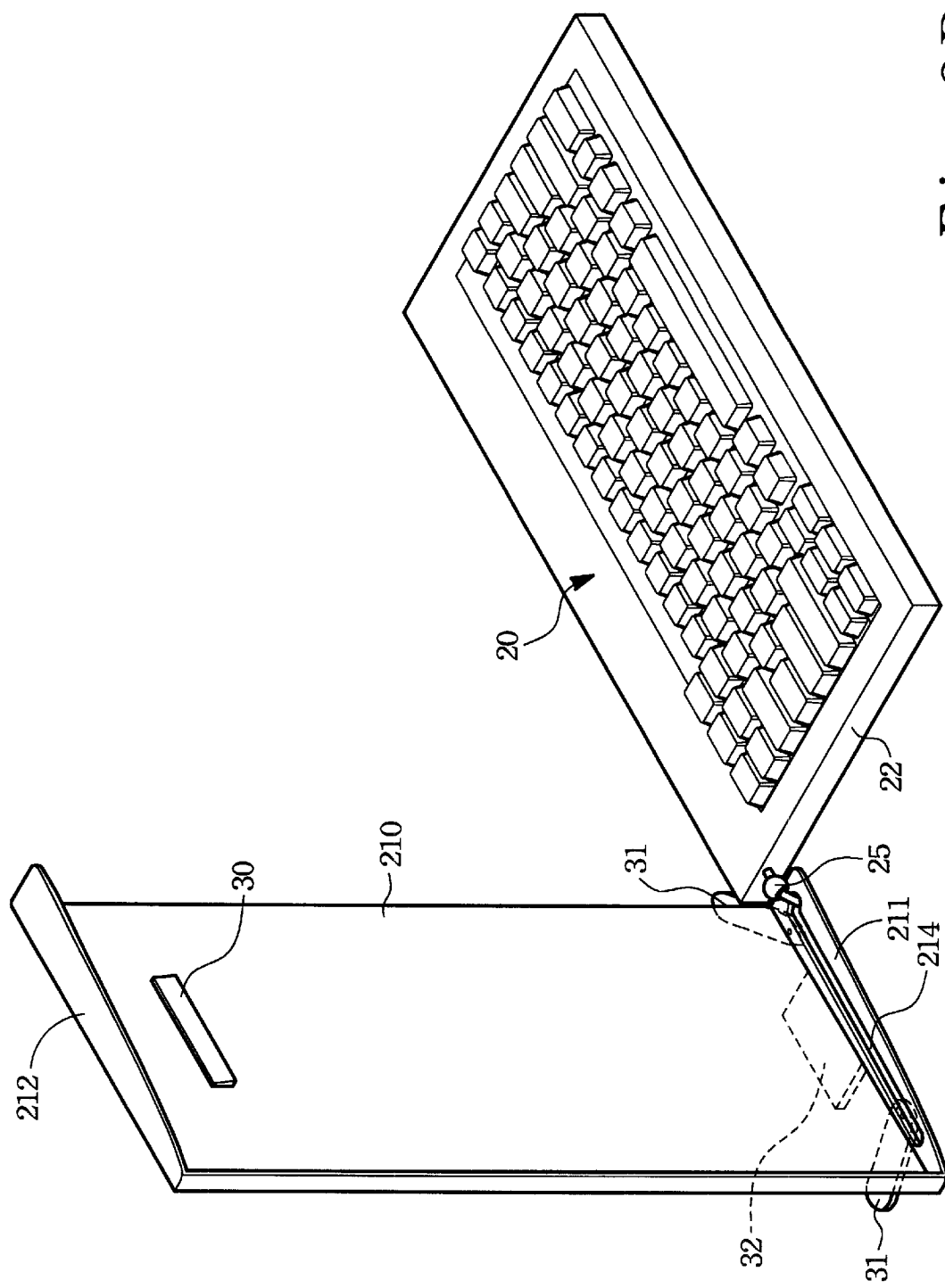

When the guarding pad 21 is moved and the slide elements 201, 202 are located at the rear ends 2132, 2142 of the slide channels 212, 214, the guarding pad 21 may be turned 180 degrees and nestled under the keyboard body 20 (as shown in FIG. 8C).

In the second embodiment, the slide elements and universal joint are constructed substantially like the first embodiment, which details will be omitted.

While the preferred embodiments of the inventions have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A multifunctional keyboard, comprising:
   a keyboard body having at least one anchor groove located on one side of the keyboard body; and
   a guarding pad having an universal joint mounted to a selected location thereof corresponding to the anchor groove of the keyboard body, the universal joint being engaged with the anchor groove through a slide element, the keyboard body and the guarding pad being turnable relative to each other in a selected direction through the universal joint.

2. The multifunctional keyboard of claim 1, wherein the keyboard body further has two sides which have respectively a slide channel, the anchor groove being formed at a front end of the slide channel, the guarding pad having an upper lid, a first wing plate and a second wing plate, the first wing plate and the second wing plate being located on a lower side of two edges of the upper lid, the universal joint being located on an inner side of the first wing plate.

3. The multifunctional keyboard of claim 2, wherein the slide element is movable to the front end of the slide channel for the guarding pad to cover a surface of the keyboard body.

4. The multifunctional keyboard of claim 2, wherein the slide element is movable to a read end of the slide channel for the guarding pad to engage with a rear end of the keyboard body to support users' wrists when operating the keyboard body.

5. The multifunctional keyboard of claim 2, wherein the second wing plate has an inner side with a slide element mounted thereon to couple with the slide channel located on another side of the keyboard body.

6. The multifunctional keyboard of claim 5, wherein the slide element of the second wing plate is detachable from the slide channel of the keyboard body to allow the guarding pad lifting from the keyboard body and turnable to a selected direction through the universal joint.

7. The multifunctional keyboard of claim 2, wherein the slide element of the guarding pad consists of a shaft and a roller for rolling in the slide channel.

8. The multifunctional keyboard of claim 2, wherein the anchor groove is located at the front end of the slide channel and extended downwards to engage the slide element when the slide element is moved to the front end of the slide channel to prevent the guarding pad from slipping away from the slide channel.

9. The multifunctional keyboard of claim 1, wherein the universal joint consists of a ball head and a ball hub thereby is turnable in any direction desired.

10. The multifunctional keyboard of claim 2, wherein the slide element is movable to a rear end of the slide channel for the guarding pad to turn substantially 180 degrees and nestle under the keyboard body.

11. A guarding pad for a multifunctional keyboard for use on a keyboard body which has at least one side formed with an anchor groove, the guarding pad comprising an universal joint mounted to a location corresponding to the anchor groove of the keyboard body, the universal joint being coupled within the anchor groove through a slide element such that the keyboard body and the guarding pad are turnable relative to each other in any direction through the universal joint.

12. The multifunctional keyboard of claim 11, wherein the keyboard body further has two sides which have respectively a slide channel, the anchor groove being formed at a front end of the slide channel, the guarding pad having an upper lid, a first wing plate and a second wing plate, the first wing plate and the second wing plate being respectively located on a lower side of two edges of the upper lid, the universal joint being located on an inner side of the first wing plate.

13. The multifunctional keyboard of claim 12, wherein the second wing plate has an inner side with a slide element mounted thereon to couple with the slide channel located on another side of the keyboard body.

14. The multifunctional keyboard of claim 13, wherein the slide element of the second wing plate is detachable from the slide channel of the keyboard body to allow the guarding pad lifting from the keyboard body and turnable to a selected direction through the universal joint.

15. The multifunctional keyboard of claim 13, wherein the anchor groove is located at the front end of the slide channel and extended downwards to engage the slide element when the slide element is moved to the front end of the slide channel to prevent the guarding pad from slipping away from the slide channel.

* * * * *